(12) United States Patent
Shaw et al.

(10) Patent No.: US 7,182,600 B2
(45) Date of Patent: Feb. 27, 2007

(54) METHOD AND SYSTEM FOR TEACHING VOCABULARY

(75) Inventors: Gordon L. Shaw, Laguna Beach, CA (US); Mark Bodner, Placentia, CA (US); Linda M. Rodgers, Los Alamitos, CA (US)

(73) Assignee: M.I.N.D. Institute, Costa Mesa, CA (US)

( * ) Notice: Subject to any disclaimer, the term of this patent is extended or adjusted under 35 U.S.C. 154(b) by 332 days.

(21) Appl. No.: 10/319,254

(22) Filed: Dec. 12, 2002

(65) Prior Publication Data

US 2003/0165800 A1    Sep. 4, 2003

Related U.S. Application Data

(60) Provisional application No. 60/340,514, filed on Dec. 13, 2001.

(51) Int. Cl.
G09B 19/00 (2006.01)

(52) U.S. Cl. .................. 434/156; 434/169; 434/178; 434/323; 434/362

(58) Field of Classification Search .............. 434/118, 434/154, 156, 157, 169, 188, 201, 234, 307 R, 434/322, 323, 350, 353, 362, 178, 276; 702/182; 705/1, 2, 8, 11; 706/11; 707/4, 102
See application file for complete search history.

(56) References Cited

U.S. PATENT DOCUMENTS

| | | | | |
|---|---|---|---|---|
| 4,820,165 A | * | 4/1989 | Kanapa | 434/276 |
| 4,867,685 A | * | 9/1989 | Brush et al. | 434/234 |
| 5,302,132 A | * | 4/1994 | Corder | 434/156 |
| 5,590,057 A | * | 12/1996 | Fletcher et al. | 702/182 |
| 5,797,130 A | * | 8/1998 | Nelson et al. | 705/11 |
| 5,987,302 A | * | 11/1999 | Driscoll et al. | 434/353 |
| 5,987,443 A | * | 11/1999 | Nichols et al. | 706/11 |
| 6,030,226 A | * | 2/2000 | Hersh | 434/236 |
| 6,047,261 A | * | 4/2000 | Siefert | 705/11 |
| 6,164,971 A | * | 12/2000 | Figart | 434/154 |
| 6,419,496 B1 | * | 7/2002 | Vaughan, Jr. | 434/322 |
| 6,513,042 B1 | * | 1/2003 | Anderson et al. | 707/102 |
| 6,644,973 B2 | * | 11/2003 | Oster | 434/178 |
| 6,676,412 B1 | * | 1/2004 | Masterson et al. | 434/169 |
| 6,688,889 B2 | * | 2/2004 | Wallace et al. | 434/322 |
| 2001/0023059 A1 | * | 9/2001 | Toki | 434/157 |
| 2002/0042790 A1 | * | 4/2002 | Nagahara | 707/4 |

(Continued)

OTHER PUBLICATIONS

Shaw, G.L., "Keeping Mozart in Mind," M.I.N.D. Institute/University of California, Academic Press, 2000, Cover Page, Table of Contents, Chapters 2, 12, 13, 14, 18, 19, 20, 23.

*Primary Examiner*—Joe H. Cheng
(74) *Attorney, Agent, or Firm*—Knobbe Martens Olson & Bear LLP

(57) ABSTRACT

A method using a spatial-temporal software game for both teaching math concepts to a child and for scoring the child's proficiency in these math concepts. These scores are compared with the child's performance on a language-based test of the math concepts. If the child's score on the language-based test is lower than what is reflected by the child's game scores, instruction is given the child using stories and flashcards related to the spatial-temporal software games so that the child will relate vocabulary terms with the math concepts and characters in the temporal-spatial software game.

20 Claims, 2 Drawing Sheets

U.S. PATENT DOCUMENTS

| | | |
|---|---|---|
| 2002/0150868 A1* | 10/2002 | Yui et al. .................... 434/156 |
| 2003/0009352 A1* | 1/2003 | Bolotinikov et al. .......... 705/1 |
| 2003/0017442 A1* | 1/2003 | Tudor et al. ................ 434/322 |
| 2003/0039948 A1* | 2/2003 | Donahue .................... 434/322 |
| 2004/0039603 A1* | 2/2004 | Hanrahan ..................... 705/2 |
| 2004/0111310 A1* | 6/2004 | Szlam et al. ................... 705/8 |

* cited by examiner

METHOD AND SYSTEM FOR TEACHING VOCABULARY

RELATED APPLICATION

The present application claims priority benefit under 35 U.S.C. § 119(e) from U.S. Provisional Application No. 60/340,514, filed Dec. 13, 2001, entitled "Method and System for Teaching Vocabulary," the entire contents of which is hereby expressly incorporated by reference.

APPENDICES A, B, AND C

Appendices A, B, and C are attached hereto and form part of the application as filed.

FIELD OF THE INVENTION

The present invention relates to a system and method for teaching vocabulary, more particularly to teaching math vocabulary.

BACKGROUND OF THE INVENTION

An educational approach using spatial-temporal reasoning, making a mental image and projecting it ahead in space and time by performing a temporal sequence of spatial operations on that image, is an alternative approach to the traditional language-based education. Spatial-temporal software is used to help persons learn math concepts by using a spatial temporal approach. Spatial-temporal software includes, but is not limited to, software games designed to train students to use spatial-temporal abilities to conceptually learn and understand math concepts. "Keeping Mozart in Mind" by Gordon L. Shaw, Ph.D. (Academic Press 2000) and Appendix A provide some examples of spatial-temporal software. "Keeping Mozart in Mind" by Gordon L. Shaw, Ph.D. (Academic Press 2000) is incorporated by reference in its entirety herein. Spatial-temporal software includes a broader range of software than those disclosed in Gordon L. Shaw's book and Appendix A. In some situations, spatial-temporal software teaches math concepts to persons that unsuccessfully attempted to learn those math concepts through traditional language-based approach. In some situations, spatial-temporal software teaches math concepts to persons; however, the standardized test scores of those persons fail to reflect their knowledge of those math concepts. Accordingly, a method and system are needed to increase a person's test scores to reflect the proficiency demonstrated by the spatial-temporal software. Embodiments of the present invention seek to overcome some or all of these and other problems.

SUMMARY OF THE INVENTION

In an aspect of an embodiment of the invention, a language-based test that is designed to test concepts (e.g., math concepts or the like) and spatial-temporal software that is configured to teach some or all of those concepts are provided. A list of vocabulary terms is advantageously provided, wherein some or all of the terms appear in the language-based test. In another aspect, a set of flashcards advantageously uses a set or subset of the list of vocabulary terms and optionally combines the set or subset with corresponding portions (e.g., math concepts, game concepts or the like) of the spatial-temporal software. In another aspect, a story advantageously uses a set or subset of the list of vocabulary terms and optionally combines the set or subset with corresponding portions of the spatial-temporal software. For example, in a preferred embodiment, a student advantageously plays a spatial-temporal software game and consequently learns some or all of the concepts tested in a language-based test. Where the student is unfamiliar with the vocabulary terms associated with the learned concepts, the student advantageously reviews the flashcards and/or advantageously reviews the story to associate the vocabulary terms with the learned concepts. Consequently, the student learns the definitions of the vocabulary terms, and where a student's past performance on language-based tests has been low from an inadequate vocabulary, the student's performance on language-based tests improves.

In another embodiment of the invention, the spatial-temporal software is provided in which a set or subset of the terms from the list of the vocabulary terms is associated with corresponding portions of the spatial-temporal software. For example, in an illustrative embodiment, a set or subset of the terms from the list of vocabulary terms is advantageously displayed within a spatial-temporal software game along with other portions of the software for the purpose of helping the student playing the game associate the vocabulary terms with the corresponding portions of the software. Consequently, the student learns the definitions of the vocabulary terms, and where a student's past performance on language-based tests has been low from an inadequate vocabulary, the student's performance on language-based tests improves.

For purposes of summarizing the invention, certain aspects, advantages and novel features of the invention have been described herein. Of course, it is to be understood that not necessarily all such aspects, advantages or features will be embodied in any particular embodiment of the invention.

DETAILED DESCRIPTION OF THE PREFERRED EMBODIMENT

Figure 1:
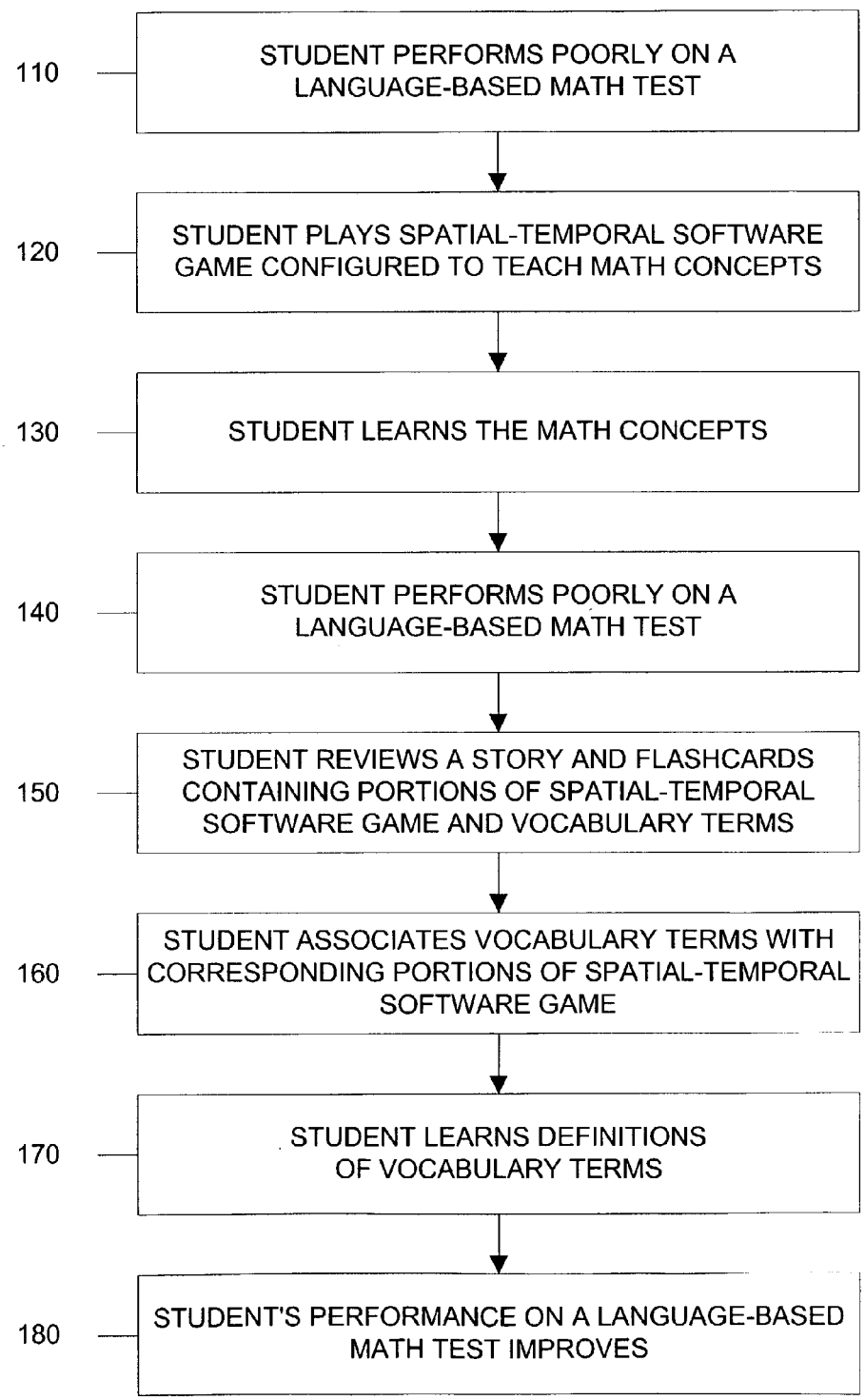
FIG. 1 is a flowchart illustrating a method in accordance with an embodiment of the invention.

The drawings and the following descriptions are provided to illustrate embodiment of the invention and not to limit the scope of the invention.

In some situations, spatial-temporal software teaches math concepts to persons that unsuccessfully attempted to learn those math concepts through traditional language-based approach. For some persons, spatial-temporal software teaches math concepts to the persons; however, the language-based test scores of those persons fail to reflect their knowledge of those math concepts. For example only and not to limit the scope of the invention, a child may lack certain language skills. In that situation, a low score from a language-based, standardized test score reflects that child's lack of the knowledge of the language and not the child's true understanding of the math concepts that are being tested. For example only and not to limit the scope of the invention, in another instance, the child lacks certain language skills because the child speaks a first language and the standardized test is in a secondary language.

In one embodiment of the invention, a list of vocabulary terms is provided, wherein the terms appear in a targeted test. For example only and not to limit the scope of the invention, a standardized, language-based is the targeted test. An example of a list of vocabulary terms is provided in the index of the story of Appendix B, and is intended as an example only and not to limit the scope of the claimed invention. In a preferred embodiment, the list of vocabulary terms comprises the list of vocabulary terms provided in the index of the story of Appendix B. In another embodiment, the list of vocabulary terms comprises at least fifty percent of the list of vocabulary terms provided in the index of the story of Appendix B; however, other percentages greater than fifty percent may be used in this embodiment. In another embodiment, a list of vocabulary terms comprises any suitable combination of vocabulary terms found in standardized tests, textbooks, sample exams, practice exams, practice books, or any math-related medium. In the situation where the standardized test score fails to reflect the knowledge of the person, the list of vocabulary terms may be used to help to bridge the difference between the person's knowledge and the standardized test score. Lists may be used for purposes beyond improving standardized, language-based test performance.

In another embodiment on the invention, flashcards are provided, wherein the flashcards use a set or subset of the terms from the list of vocabulary terms. In the situation where the standardized test score fails to reflect the knowledge of the person, the flash cards may help to bridge the difference between the person's knowledge and the standardized test score. Flashcards may be used for purposes beyond improving standardized, language-based test performance. Flashcards may be displayed and provided in any suitable means, including, but not limited to, software display, an Internet document format, and tangible cards. Flashcards are provided in Appendix C, and are intended as examples only and not to limit the scope of the claimed invention.

In another embodiment of the invention, flashcards are provided in which a set or subset of the terms from the list of the vocabulary terms is combined with corresponding portions of the spatial-temporal software. Corresponding portions of the spatial-temporal software include, but are not limited to, the concepts, characters, visual elements, textual elements, audio elements, or any suitable sensory elements in software games. Through combining the vocabulary terms with portions of the spatial temporal software, the flashcards are used to learn vocabulary terms associated with the math concepts from the spatial-temporal math software. In the situation where the standardized test score fails to reflect the knowledge of the person, using the flashcards helps the person to bridge the difference between the person's knowledge and the standardized test score. Flashcards are provided in Appendix C, and are intended as examples only and not to limit the scope of the claimed invention.

In another embodiment of the invention, a story is provided in which a set or subset of the terms from the list of vocabulary terms are used. In another embodiment, a story is provided in which a set or subset of the terms in the list of vocabulary terms is combined with corresponding portions of the spatial-temporal software. Corresponding portions of the spatial-temporal software include, but are not limited to, the concepts, characters, visual elements, textual elements, audio elements, or any suitable sensory elements in software games. Through combining the vocabulary terms with portions of the spatial temporal software, the story is used to learn the vocabulary terms associated with the math concepts from the spatial-temporal math software. In the situation where the standardized test score fails to reflect the knowledge of the person, reading the story helps the person to bridge the difference between the person's knowledge and the standardized test score. Stories may be used for purposes beyond improving standardized, language-based test performance. Stories may be displayed in any suitable media, including, but not limited to, software display, an Internet document format, books, comic books, newspaper, and magazines. In another embodiment of the invention, vocabulary terms are displayed in text that is different from other text in the story in any suitable manner, including, but not limited to, a different font type, font style, font size, or font color. An example of a story is provided in Appendix B, and is intended as an example only and not to limit the scope of the claimed invention.

In another embodiment of the invention, a story and flashcards are provided in which a set or subset of the terms from the list of the vocabulary terms is used. In another embodiment of the invention, a story and flashcards are provided in which a set or subset of the terms from the list of the vocabulary terms is combined with corresponding portions of the spatial-temporal software. Portions of the software include, but are not limited to, the concepts, characters, visual elements, textual elements, audio elements, or any suitable sensory elements in software games. In the embodiments where a story and flashcards are provided, the flashcards and story may be provided in any combination of suitable forms of stories and flashcards. They may, but need not be, provided in the same form. In another embodiment, a story and flashcards are provided in a software format. In another embodiment, a spatial-temporal software game, a corresponding story, and corresponding flashcards are provided in a software format. In the embodiments where a story and flashcards are provided, the story and flashcards may share similar concepts, characters, visual elements, textual elements, audio elements, or any suitable sensory elements, which may or may not be embodied in a spatial-temporal software program.

In another embodiment of the invention, spatial-temporal software is provided in which a set or subset of the terms from the list of the vocabulary terms is associated with corresponding portions of the spatial-temporal software within the spatial-temporal software program itself. Portions of the software include, but are not limited to, the concepts, characters, visual elements, textual elements, audio elements, or any suitable sensory elements in software games. For example only and not to limit the scope of the invention, in one embodiment of the invention, a set or subset of the terms from the list of vocabulary terms may be displayed within a spatial-temporal software game along with other portions of the software for the purpose of helping the person playing the game associate the terms with the corresponding portions of the software. The vocabulary terms may be displayed in a similar manner to the way that a story would display them, or may be displayed in any suitable manner. In the situation where the standardized test score fails to reflect the knowledge of the person, using the software helps the person to bridge the difference between the person's knowledge and the standardized test score. Spatial-temporal software may be used for purposes beyond improving standardized, language-based test performance.

In another embodiment of the invention, the spatial-temporal software is provided in which the spatial-temporal software comprises certain concepts. In one embodiment of the invention, the spatial-temporal software comprises math concepts, which include addition, subtraction, multiplication, place value, fractions, measurement, probability, estimation, equations, symmetry, proportions, graphs, telling time, ratios, and any other suitable math concept. In one embodiment of the invention, the spatial-temporal software comprises game concepts, which include game tasks, game objectives, game processes, or any suitable element of the game. These games concepts may be, but need not be, designed to teach certain math concepts. The spatial temporal software may comprise other concepts than those listed herein.

In another embodiment of the invention, any combination of spatial-temporal software, a story, and flashcards are provided for a target age range, school level range, or other suitable group criteria. The range may contain one or more ages. The range may contain one or more school grade levels. While this embodiment may be created for a target age range, this embodiment may be used for remedial purposes for persons outside the target range, including, but not limited to younger children, older children, and adults. For example only and not to limit the scope of the invention, in a preferred embodiment, the list of vocabulary terms in the index of the story of Appendix B, the story of Appendix B, the spatial temporal software described in Appendix A, and the flashcards of Appendix C are used to target children in the second grade.

In another embodiment of the invention, the vocabulary list and the spatial-temporal software involve other areas of knowledge, including, but not limited to, the sciences.

In the embodiments of the invention, the software may be any suitable software and need not be limited to spatial-temporal software. In the embodiments of the invention, the software may be operated on any suitable system, comprising one or more suitable computing devices.

Figure 2:
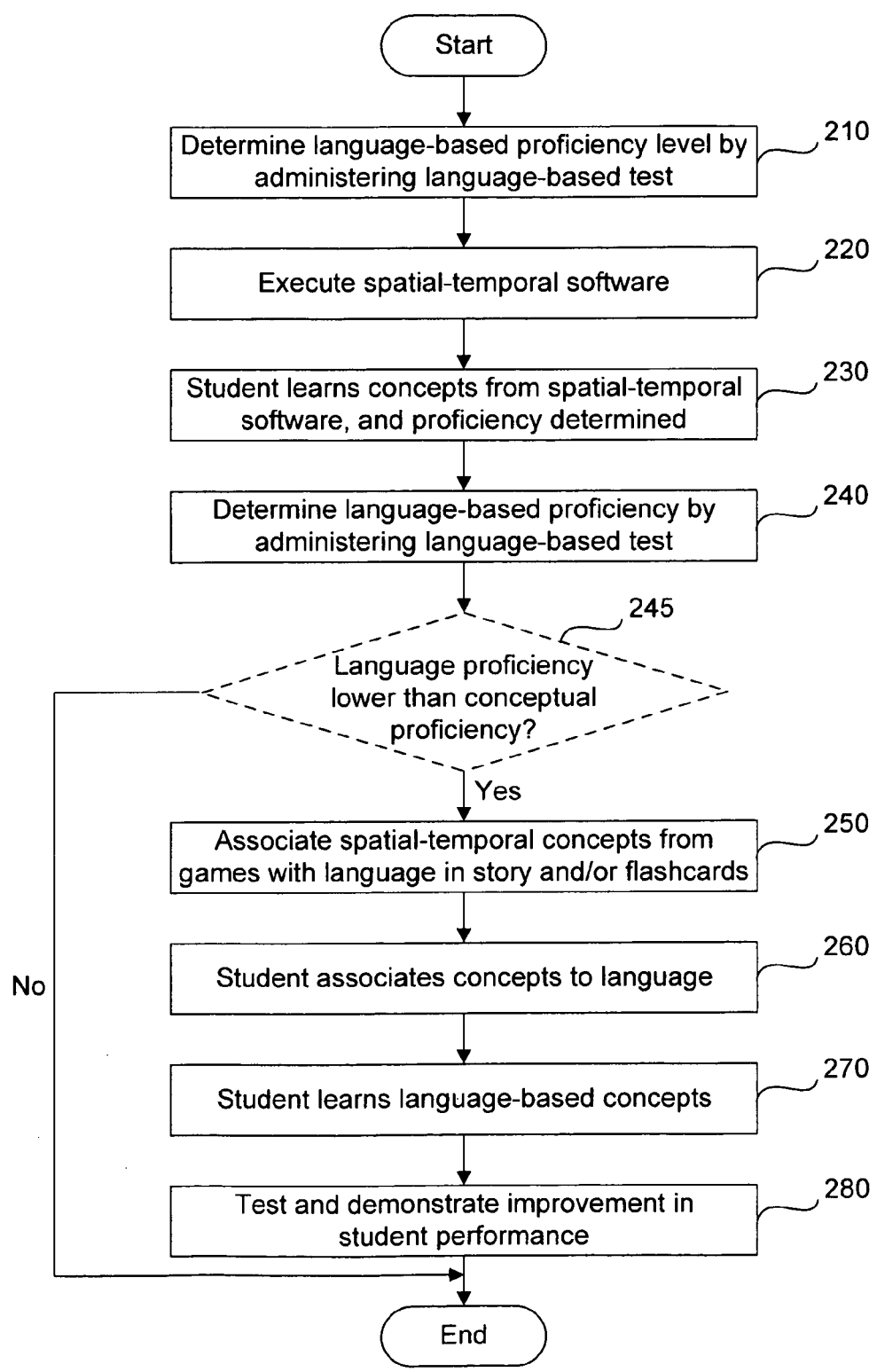
FIG. 2 is a flowchart showing an alternative embodiment of a method of teaching vocabulary.

For example only and not to limit the scope of the invention, a preferred embodiment of the invention is illustrated in FIG. 1 which provides a method for teaching vocabulary with an alternate embodiment illustrated in FIG. 2. At a block 110, a student performs poorly on a language-based test (e.g., a math test or the like). At a block 120, the student plays spatial-temporal software games configured to teach concepts embodied in the language-based test (e.g., math concepts or the like). For example, in one embodiment, a student in the second grade plays spatial-temporal software games described in Appendix A. Consequently, at a block 130, the student learns the concepts from the playing those spatial-temporal software games. The student's scores from those games are advantageously used by a teacher or suitable third-party consultant to assess the student's proficiency at the concepts embodied in the spatial-temporal software games.

As shown in FIG. 1, at a block 140, the student is given a language-based test to determine the student's proficiency at the concepts, which include concepts that were advantageously embodied in the spatial-temporal software games; however, at the block 140, the student receives a score on the language-based test that reflects a proficiency lower than what is reflected by the student's game scores. In this situation, the score from the language-based test reflects the student's lack of the knowledge of the language and not the student's true understanding of the tested concepts. As mentioned above, the student played the spatial-temporal software game and, consequently, had learned the concepts; however, because the student did not associate certain vocabulary terms with certain concepts, the student failed to achieve the language-based test scores that the student could have achieved.

As noted above, FIG. 2 is an alternate embodiment of the process illustrated in FIG. 1. The alternate process illustrated in FIG. 2 begins and proceeds to block 210, where a language-based proficiency level is determined by administering a language based test. Next, at block 220, spatial-temporal software is executed on a computing device. The process then moves to block 230, where the student learns concepts form the spatial-temporal software and a conceptual proficiency is determined. At block 240, a language-based proficiency is again determined by administering a language-based test. After administering the second language-based test, the language-based proficiency and the conceptual proficiency are compared at decision block 245. If the language proficiency is lower than the conceptual proficiency, the process ends. If, however, the language proficiency is lower than the conceptual proficiency, the process them moves to block 250, where information is displayed in which spatial-temporal concepts are associated with language in the language-based test. At block 260, the student associates the concepts to the language, and as a result, at block 270, the student learns the language-based concepts. Finally, at block 280 an additional test may be given to the student to demonstrate improved performance.

As shown in FIG. 1, at a block 150, portions of the spatial-temporal software game are contained in the story and flashcards, and the student reads the story and reviews the flashcards. Consequently, at a block 160, the use of the story and flashcards help the student to associate the vocabulary terms with those portions. Thus, at a block 170, the student learns the definitions of the vocabulary terms, and the student's performance improves on a subsequent language-based test at a block 180. For example, in an embodiment, within the story and flashcards, the vocabulary terms are advantageously associated with one or more characters from the spatial temporal software game and advantageously associated with corresponding math concepts from the spatial temporal software game. Consequently, when reading or reviewing the story and flashcards, the student will associate those vocabulary terms with those already familiar math concepts and characters. In other embodiments, the vocabulary is advantageously associated with any suitable portion of the software to help the student learn the vocabulary, including, but not limited to, game concepts. As those associations are made, the student learns the vocabulary terms. By learning those vocabulary terms, the student's performance on the language-based tests is improved. The embodiments of the invention described herein may advantageously be used before the student takes a language-based test to help the student prepare for the test, may advantageously be used for preparation for any math test, and may advantageously be used as part of any suitable math education program.

For example only and not to limit the scope of the invention, in a preferred embodiment of the invention, a teacher provides a spatial-temporal software game for the student to play and learn math concepts. At this point, the student may or may not know the vocabulary terms that correspond to the math concepts. The teacher provides a reading assignment for the student as an after-school supplement to the in-class instruction. In a further embodiment, the reading assignment is from the story in Appendix B. In an additional embodiment, the teacher reviews the flashcards with the student in class. In a further embodiment, the flashcards are from Appendix C. Reviewing the flashcards from Appendix C and reading the story from Appendix B advantageously help the student to learn the vocabulary terms from the index of the story in Appendix B. Consequently, the student achieves a higher score on the language-based, standardized test.

For example only and not to limit the scope of the invention, in another preferred embodiment of the invention, the teacher provides a software application package to the student. The software application package comprises a spatial temporal software game, a story, and flashcards. The teacher instructs the student to play the spatial-temporal software game, read the story, and review the flashcards according to a suitable instruction plan chosen by the teacher.

Although this invention has been described in terms of certain preferred embodiments, other embodiments that are apparent to those of ordinary skill in the art, including embodiments which do not provide all of the benefits and features set forth herein, are also within the scope of this invention. Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A computerized method operating on a computing device for improving a student's score on a language-based test by relating understood spatial-temporal concepts to less-understood language-based concepts, the method comprising:
    determining an initial language-based proficiency level in a subject by administering an initial language-based test having a list of language terms to the student;
    interactively displaying animated characters and spatial-temporal features corresponding to at least a portion of the language terms which are controllable by student input so as to teach the subject to the student;
    determining a conceptual proficiency level based on the student's performance in the interactive display;
    determining a subsequent language-based proficiency level in the subject by administering a subsequent language-based test to the student;
    comparing the conceptual proficiency level with the subsequent language-based proficiency level; and
    if the conceptual proficiency level is less than the subsequent language-based proficiency level, displaying information to the student which associates concepts represented by language from either the initial or the subsequent language-based test to corresponding concepts represented by animated characters used in the interactive display.

2. The computerized method of claim 1, wherein the displayed information is digital flashcards or a story.

3. A computerized method operating on a computing device for improving a student's score on a language-based test by relating spatial-temporal concepts to language-based concepts, the method comprising:
    determining a language-based proficiency level in a subject by administering a language-based test having a list of language terms to the student;
    interactively displaying spatial-temporal features corresponding to at least a portion of the language terms which are controllable by student input so as to teach the subject to the student;
    determining a conceptual proficiency level based on the student's performance in the interactive display;
    comparing the conceptual proficiency level in the subject with the language-based proficiency level in the subject;
    associating the language-based concepts tested by the language-based test to corresponding spatial-temporal concepts based on the result of the comparing; and
    displaying information to the student indicative of the association of the language-based concepts and the corresponding spatial-temporal concepts.

4. The computerized method of claim 3, wherein the language-based concepts comprise a list of vocabulary terms.

5. The computerized method of claim 4, wherein the language-based concepts are associated to corresponding spatial-temporal concepts by:
    including the vocabulary terms in a story; and
    displaying the story in combination with corresponding portions of the spatial-temporal concepts embodied in the software.

6. The computerized method of claim 3, wherein the conceptual proficiency level in the subject is greater than the language-based proficiency level in the subject.

7. The computerized method of claim 3, wherein the language-based concepts are associated to corresponding spatial-temporal concepts by electronic flashcards displayed to the student.

8. The computerized method of claim 7, wherein the spatial-temporal concepts on the flashcards are understood by the student.

9. The computerized method of claim 8, wherein the language-based concepts on the flashcards are not fully understood by the student.

10. The computerized method of claim 9, wherein the subject is math.

11. The computerized method of claim 3, wherein the spatial-temporal concepts are embodied at least partially in one or more animated character.

12. A computer readable medium comprising computer executable instructions that cause a computer to perform a method for improving a student's score on a language-base test by relating spatial-temporal concepts to language-based concepts, the method comprising:
    determining a language-based proficiency level in a subject by administering a language-based test having a list of language terms to the student;
    interactively displaying spatial-temporal features corresponding to at least a portion of the language terms which are controllable by student input so as to teach the subject to the student;
    determining a conceptual proficiency level based on the student's performance in the interactive display;
    comparing the conceptual proficiency level in the subject with the language-based proficiency level in the subject;
    associating the language-based concepts tested by the language-based test to corresponding spatial-temporal concepts based on the result of the comparing; and
    displaying information to the student indicative of the association of the language-based concepts and the corresponding spatial-temporal concepts.

13. The computer readable medium of claim 12, wherein the language-based concepts comprise a list of vocabulary terms.

14. The computer readable medium of claim 13, wherein the language-based concepts are associated to corresponding spatial-temporal concepts by:
    including the vocabulary terms in a story; and
    displaying the story in combination with corresponding portions of the spatial-temporal concepts embodied in the software.

15. The computer readable medium of claim 12, wherein the conceptual proficiency level in the subject is greater than the language-based proficiency level in the subject.

16. The computer readable medium of claim 12, wherein the language-based concepts are associated to corresponding spatial-temporal concepts by electronic flashcards displayed to the student.

17. The computer readable medium of claim 16, wherein the spatial-temporal concepts on the flashcards are understood by the student.

18. The computer readable medium of claim 17, wherein the language-based concepts on the flashcards are not fully understood by the student.

19. The computer readable medium of claim 18, wherein the subject is math.

20. The computer readable medium of claim 12, wherein the spatial-temporal concepts are embodied at least partially in one or more animated character.

\* \* \* \* \*